M. J. HEALY.
RIVET HEAD TRIMMER.
APPLICATION FILED JAN. 4, 1915.
1,160,889.
Patented Nov. 16, 1915.
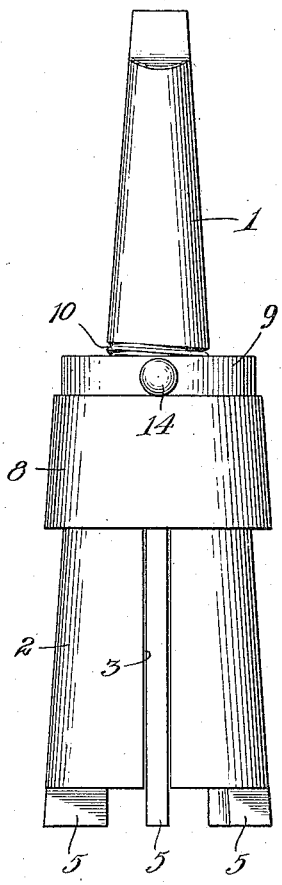
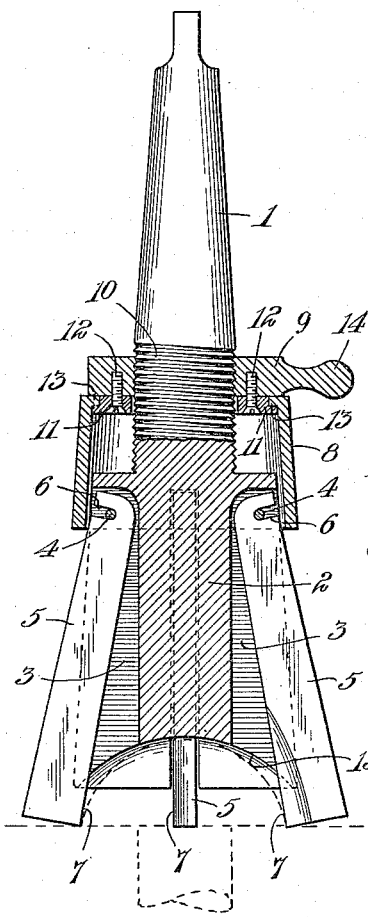
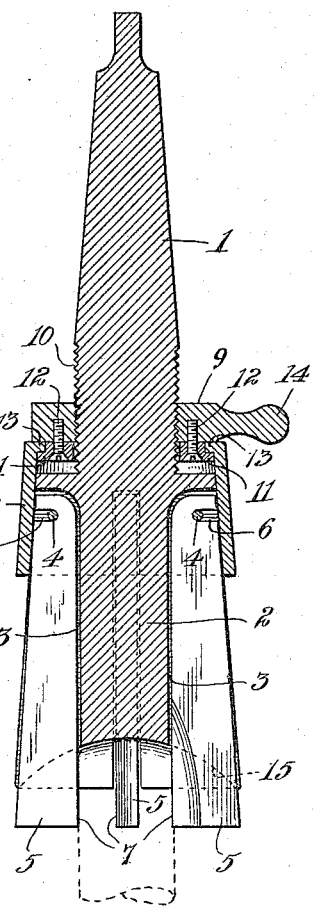
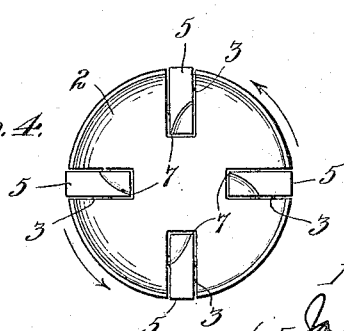
Inventor,
Michael J. Healy,
his Attorney.

UNITED STATES PATENT OFFICE.

MICHAEL J. HEALY, OF CHICAGO, ILLINOIS, ASSIGNOR OF ONE-HALF TO CAESAR DAL PINO, OF CHICAGO, ILLINOIS.

RIVET-HEAD TRIMMER.

1,160,889.   Specification of Letters Patent.   Patented Nov. 16, 1915.

Application filed January 4, 1915. Serial No. 402.

*To all whom it may concern:*

Be it known that I, MICHAEL J. HEALY, a citizen of the United States, and a resident of the city of Chicago, county of Cook, and State of Illinois, have invented certain new and useful Improvements in Rivet-Head Trimmers, of which the following is a specification.

My invention relates to improvements in cutting devices adapted for use in the trimming down of the heads of rivets so as to permit of ready removal of the latter.

The object of my invention is the production of a tool of this class which will be portable in character, and which will be of durable and economical construction and efficient in use.

Other objects will appear hereinafter.

The invention consists in the combinations and arrangements of parts hereinafter described and claimed.

The invention will be best understood by reference to the accompanying drawing forming a part of this specification, and in which, Figure 1 is a side elevation of a device embodying my invention, Fig. 2 is a central section of the device showing the cutting elements thereof in outward position, Fig. 3 is a view similar to Fig. 2, showing the cutting elements of the device in inward position, and Fig. 4 is a bottom plan view of Fig. 1.

The preferred form of construction, as illustrated in the drawings comprises a tapering shank 1 formed at its lower end with a head or enlargement 2 of frusto-conical or correspondingly tapering formation. Formed in the periphery of the head 2 is a plurality of equally spaced elongated radial slots 3, each of which opens in one side and one end of said head, as clearly shown in the several views.

Provided adjacent the upper closed end of each of the slots 3 is a transversely extending pin 4, the ends of which are securely held by embedding in said head. Arranged in each of the slots 3 is an elongated cutting element 5, the upper end of which pivotally engages with the corresponding pin 4. Said end of said cutting element is provided with a laterally opening slot 6 which permits of ready detachment of the cutting element when the latter is rocked to horizontal position, or to a position at substantially right angles to the axis of the shank 1. The construction is such, however, that said cutting elements will be locked to the head 2 when the same are in depending or operative position, as shown in the several views. The lower or free end of each cutting element 5 is cut away at its inner side to form a cutting edge 7. The detachable connection of said cutting elements with the head 2, just referred to, is of special advantage in that it permits of ready detachment of the blades for sharpening of the same, as will be readily understood.

Provided at the upper end of the head 2 is a longitudinally shiftable sleeve 8 of a form corresponding with that of said head, the same being adapted, when moved downwardly or toward the cutting elements 5, to rock the same inwardly, as clearly shown in Fig. 3. Such shifting of the sleeve 8 is effected by means of a collar 9 provided with internal threads which engage with left hand threads 10 which are provided at the cylindrically formed base of shank 1. At the under side of member 9 is provided a retainer ring 11 detachably secured in position by screws 12. The retainer ring 11 is formed for engagement with an inwardly projecting annular flange 13 formed at the upper end of sleeve 8, the arrangement being such, as will be seen, that said sleeve will be locked to the member 9 against longitudinal movement relative thereto, but in such a manner as to permit of free relative rotary movement of said sleeve.

Provided at one side of the member 9 is an outwardly projecting finger piece 14 which affords means for manually arresting rotary movement of the member 9 during rotation of the shank 1. With this arrangement, it will be seen, that in use, or during rotation of the device, when it is desired to rock the cutting elements 5 inwardly, it is only necessary to engage the finger piece 14 in order to arrest movement of the member 9. When this is done, the continued rotation of the shank 1 will cause the member 9 and hence the sleeve 8 to be moved downwardly with the result of carrying said sleeve into engagement with the outer edges of cutting elements 5, so as to rock the same inwardly to the position shown in Fig. 3. By reason of the connection between the member 9 and the sleeve 8 which permits of free relative rotary movement of the latter, upon said sleeve contacting with the cutting elements 5, rotation thereof in unison with said cutting elements will be permitted without disturbing the operative connection between said sleeve and the member 9. The lower end of head 2 is hollowed out, or recessed as at 15 for the reception of a rivet head, and the lower ends of the cutting elements project beyond the lower end of said head for engagement with the rivet head, as clearly shown in Fig. 2.

With the construction set forth, when it is desired to trim down a rivet head, to the diameter of the shank of the rivet in order to permit of ready removal of the latter from the work in which the same is secured, it is only necessary, after connecting the tool with a flexible driving shaft, to place the outer end of the tool with the cutting edges 7 of the cutting members 5 thereof in contact with the rivet head, as shown in Fig. 2. This having been done, upon rotation of the tool and upon arresting rotation of member 9, the sleeve 8 will be moved toward the cutting elements 5 and cause the free ends thereof to be rocked inwardly so as to gradually trim down the rivet head, as shown in Fig. 3. With the head at one end of the rivet trimmed down to the diameter of the shaft thereof, it is apparent that the rivet may be readily driven out and thus removed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A device of the class described comprising a shank; a head at one end of said shank; a plurality of radial slots in said head opening at the side and one end of said head; a plurality of cutting elements mounted in said slots having corresponding ends pivotally secured to said head so as to permit of radial swinging of the opposite ends thereof, said last mentioned ends of said cutting elements extending beyond the corresponding end of said head and having cutting edges at their inner sides; a sleeve shiftable longitudinally of said head for swinging said cutting elements inwardly; means for shifting said sleeve during rotation of said shank, said means comprising a member loosely engaging left hand threads provided on said shank; an inwardly extending flange at one end of said sleeve engaging a circumferential groove provided in said member whereby said sleeve will be locked to said member in such a manner as to permit of free relative rotary movement of said sleeve; and means for manually arresting rotary movement of said member during rotation of said head, substantially as described.

In testimony whereof I have signed my name to this specification in the presence of two subscribing witnesses.

MICHAEL J. HEALY.

Witnesses:
JOSHUA R. H. POTTS,
HELEN F. LILLIS.

Copies of this patent may be obtained for five cents each, by addressing the "Commissioner of Patents, Washington, D. C."